(12) United States Patent
Kishorbhai Sanchaniya

(10) Patent No.: US 12,217,119 B2
(45) Date of Patent: Feb. 4, 2025

(54) SYSTEMS AND METHODS FOR ADAPTIVE BEAM STEERING FOR THROUGHWAYS

(71) Applicant: ZEBRA TECHNOLOGIES CORPORATION, Lincolnshire, IL (US)

(72) Inventor: Pragnesh Kishorbhai Sanchaniya, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 654 days.

(21) Appl. No.: 17/383,045

(22) Filed: Jul. 22, 2021

(65) Prior Publication Data

US 2023/0024769 A1    Jan. 26, 2023

(51) Int. Cl.
*G06K 7/10* (2006.01)
*G06T 7/246* (2017.01)
(Continued)

(52) U.S. Cl.
CPC .......... *G06K 7/10316* (2013.01); *G06T 7/248* (2017.01); *G06T 7/70* (2017.01);
(Continued)

(58) Field of Classification Search
CPC ........... G06K 7/10128; G06K 7/10356; G06K 7/10316; G06V 20/54; G06V 20/625;
(Continued)

(56) References Cited

U.S. PATENT DOCUMENTS 5,751,227 A * 5/1998 Yoshida ................ G07B 15/063
455/107
9,311,799 B2 * 4/2016 Jain ..................... G06K 7/10128
(Continued)

FOREIGN PATENT DOCUMENTS

CN    102622784 A  *  8/2012
CN    102622785 A  *  8/2012
(Continued)

OTHER PUBLICATIONS

J. Ryoo et al., Phase-based Ranging of RFID Tags with Applications to Shopping Cart Localization, MSWiM '15: Proceedings of the 18th ACM International Conference on Modeling, Analysis and Simulation of Wireless and Mobile Systems, p. 245-249 (Year: 2015).*

I. Nachev et al., Design of phased antenna array for Uhf Rfid applications, IOP Conf. Series: Materials Science and Engineering, vol. 618, p. 1-18 (Year: 2019).*

(Continued)

*Primary Examiner* — Bernarr E Gregory
*Assistant Examiner* — Fred H Mull

(57) ABSTRACT

Systems and methods for monitoring a throughway using a radio frequency identification (RFID) detection system. The RFID detection system includes (i) an image sensor configured to have a field of view directed towards a lane of the throughway; (ii) an RFID transceiver arrangement configured to interrogate RFID tags disposed on vehicles within the lane of the throughway; and (iv) a controller operatively connected to the image sensor and the RFID transceiver arrangement. The controller is configured to (1) cause the image sensor to capture a frame of image data representative of the lane of the throughway; (2) analyze the frame of image data to detect a presence of a vehicle in the lane of the throughway; (3) based on the analysis, determine a position of the vehicle relative to the RFID transceiver arrangement; and (4) configure an antenna array to generate a beam directed at the position of the vehicle.

25 Claims, 4 Drawing Sheets

(51) Int. Cl.
*G06T 7/70* (2017.01)
*G06V 20/54* (2022.01)
*G06V 20/62* (2022.01)
*G07B 15/06* (2011.01)

(52) U.S. Cl.
CPC .............. *G06V 20/54* (2022.01); *G06V 20/62* (2022.01); *G07B 15/063* (2013.01); *G06T 2207/10016* (2013.01); *G06T 2207/30236* (2013.01); *G06V 20/625* (2022.01); *G06V 2201/08* (2022.01)

(58) Field of Classification Search
CPC .... G06V 20/62; G06V 2201/08; G06T 7/248; G06T 7/70; G06T 2207/10016; G06T 2207/30236; G07B 15/063
See application file for complete search history.

(56) References Cited

U.S. PATENT DOCUMENTS

| | | | |
|---|---|---|---|
| 2004/0118920 A1* | 6/2004 | He | G06V 30/274 235/454 |
| 2006/0010027 A1* | 1/2006 | Redman | G06Q 10/063116 705/7.29 |
| 2006/0212241 A1* | 9/2006 | Chiu | G01S 13/75 343/703 |
| 2006/0220791 A1* | 10/2006 | Willins | G06K 7/0008 340/572.1 |
| 2007/0035442 A1* | 2/2007 | Manasson | H01Q 21/22 342/375 |
| 2008/0012710 A1* | 1/2008 | Sadr | G01S 7/023 340/572.1 |
| 2008/0036623 A1 | 2/2008 | Rosen | |
| 2009/0096857 A1* | 4/2009 | Frisco | H04N 21/226 348/14.02 |
| 2015/0236400 A1* | 8/2015 | Yaccarino | G07B 15/063 343/893 |
| 2017/0344773 A1* | 11/2017 | Lauria | H04L 47/24 |
| 2018/0197348 A1 | 7/2018 | Wyatt et al. | |
| 2019/0114500 A1 | 4/2019 | Hedley et al. | |
| 2019/0132709 A1 | 5/2019 | Graefe et al. | |

FOREIGN PATENT DOCUMENTS

| | | | |
|---|---|---|---|
| CN | 206075540 U | * | 4/2017 |
| WO | 2019038725 A1 | | 2/2019 |

OTHER PUBLICATIONS

H. Song et al., Vision-based vehicle detection and counting system using deep learning in highway scenes, Song European Transport Research Review, vol. 11(51), p. 1-16 (Year: 2019).*
International Search Report and Written Opinion for International Application No. PCT/US2022/36534 dated Oct. 6, 2022.

* cited by examiner

SYSTEMS AND METHODS FOR ADAPTIVE BEAM STEERING FOR THROUGHWAYS

BACKGROUND

For many types of throughways, it is important to track vehicles that pass through a particular area. One example is a road tolling system via which vehicles passing through a toll area are tracked to ensure that vehicle have paid the required toll. To improve the rate at which vehicle pass through the tracked area, radio frequency identification (RFID) detection systems are implemented to automatically and wirelessly detect vehicles. In these systems, tracked vehicles are equipped with an RFID tag for responding to interrogation signals emitted by the RFID detection system that monitors the tracked area.

However, conventional RFID detection systems that monitor throughways suffer from several drawbacks. To maximize the read area, conventional RFID detection systems typically implement omnidirectional antenna systems. As a result, a large portion of the transmitted power is not directed towards the RFID tag. This may cause the RFID detection system to fail to detect some vehicles, particularly when the RFID tag is located in an unconventional location. Additionally, the omnidirectional nature of the conventional antennas reduces the read range of the RFID detection systems in any one direction. As a result, RFID detection system operators tend to configure the RFID detector stations to transmit at a maximum power that complies with applicable regulations. However, the combination of omnidirectional antennas and maximum transmission power tends to cause the transmitted signal to reach vehicles in other lanes monitored by other RFID detector stations. As a result, vehicles can be double counted and/or detected by the less efficient RFID detector station.

As another drawback, conventional RFID detection systems typically configure all of their detector stations to interrogate RFID tags at approximately the same time. However, the metal included in most vehicles is highly reflective to RF signals, and results significant multipath interference. Thus, conventional RFID detection systems may fail to read an interrogation response from an RFID tag due to the presence of multipath interference. For at least these reasons, there is a need for systems and methods for adaptive beam steering for RFID detection systems that monitor throughways.

SUMMARY

In an embodiment, the present invention is a radio frequency identification (RFID) detection system for monitoring a throughway. The RFID detection system includes (i) an image sensor configured to have a field of view directed towards a lane of the throughway; (ii) an RFID transceiver arrangement configured to interrogate RFID tags disposed on vehicles within the lane of the throughway, wherein the RFID transceiver arrangement includes an antenna array; and (iv) a controller operatively connected to the image sensor and the RFID transceiver arrangement. The controller is configured to (1) cause the image sensor to capture a frame of image data representative of the lane of the throughway; (2) analyze the frame of image data to detect a presence of a vehicle in the lane of the throughway; (3) based on the analysis, determine a position of the vehicle relative to the RFID transceiver arrangement; and (4) configure the antenna array to generate a beam directed at the position of the vehicle.

In another embodiment, a method for monitoring a throughway using a radio frequency identification (RFID) detection system is provided. The RFID detection system includes (i) an image sensor configured to have a field of view directed towards a lane of the throughway; (ii) an RFID transceiver arrangement configured to interrogate RFID tags disposed on vehicles within the lane of the throughway, wherein the RFID transceiver arrangement includes an antenna array; and (iii) a controller operatively connected to the image sensor and the RFID transceiver arrangement. The method includes (1) causing, by the controller, the image sensor to capture a frame of image data representative of the lane of the throughway; (2) analyzing, by the controller, the frame of image data to detect a presence of a vehicle in the lane of the throughway; (3) based on the analysis, determining, by the controller, a position of the vehicle relative to the RFID transceiver arrangement; and (4) configuring, by the controller, the antenna array to generate a beam directed at the position of the vehicle.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
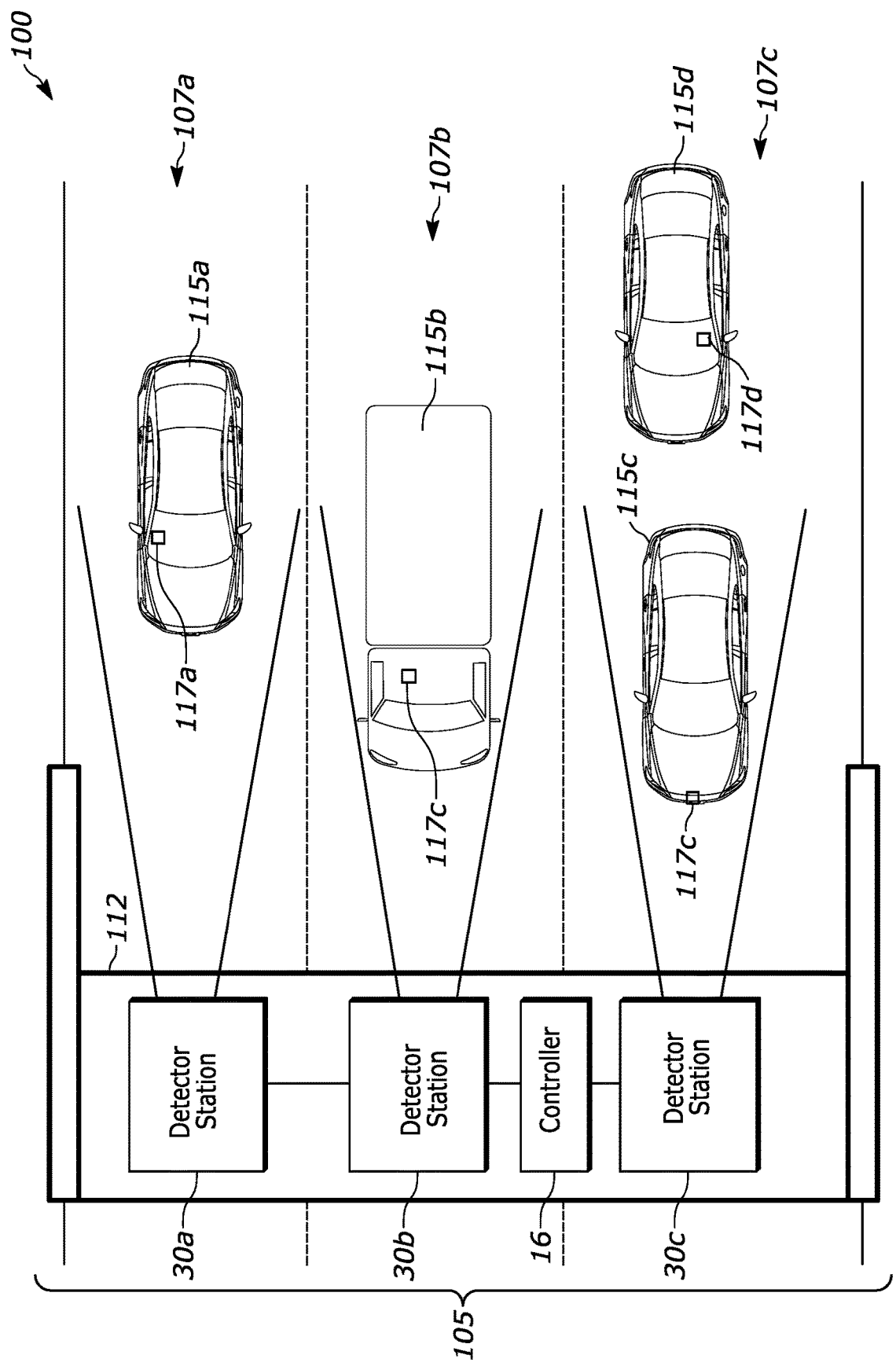
FIG. 1 illustrates an example throughway that includes the RFID detection system disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is an example environment 100 that includes a radio frequency identification (RFID) detection system 112 configured to monitor vehicle 115 traversing a throughway 105. While the environment 100 depicts the vehicles 115 as cars and trucks and the throughway 105 as a road, the throughway 105 may be any path via which vehicle 115 traverse. For example, in alternate embodiments, the throughway may be a shipping lane or corridor, a bicycle path, a corridor or aisle of a warehouse, or any other passage by which a vehicle may pass unimpeded. As such, in alternate embodiments, the vehicles 115 may be boats, ships, bicycles, motorcycles, scooters, forklifts, manned or unmanned warehouse equipment, or any other vehicle capable of traversing a throughway. In the environment 100, the throughway 105 includes three lanes 107, though, in other embodiments, the throughway 105 may include more or fewer lanes (including, in some embodiments, a single lane 107).

The RFID detection system 112 includes one or more detector stations 30 configured to detect the vehicles 115 that traverse the throughway 105. In the illustrated embodiment, each detector station 30 corresponds to a single lane 107 of the throughway 105. That is, the detector station 30a is configured to detect vehicle 115 traversing lane 107a, the detector station 30b is configured to detect vehicle 115 traversing lane 107b, and the detector station 30c is configured to detect vehicle 115 traversing lane 107c. It should be appreciated in alternate embodiments, a single detector station 30 may be disposed between two lanes 107 such that the detector station 30 is configured to detect vehicles traversing either lane 107. In the environment 100, the detector stations 30 are disposed on a truss or other structure above the throughway 105. In other embodiments, the detector stations 30 may be disposed in other locations (e.g., along the outside of the throughway 105, between the lanes 107 of the throughway 105, or within units located in and/or below a surface throughway 105 itself). As further described herein, the detector stations 30 include RFID transceiver arrangements that are able to detect RFID tags 117 that are affixed to the vehicle 115. For example, the RFID tags may be affixed to a windshield of the vehicle (e.g., the RFID tags 117a and 117d), to a roof of the vehicle and/or trailer associated with the vehicle (e.g., the RFID tag 117), on a license plate assembly (e.g., the RFID tag 117c), or other locations of the vehicle. The detector stations 30 also include image sensors configured to capture frames of image data indicative of the lane 107 monitored by the detector station 30.

The RFID detection system 112 also includes a controller 16 that may be operated by personnel associated with the throughway and/or the RFID detection system 112. In the environment 100, the controller 16 is disposed on the same structure as the detector stations 30. In other embodiments, the controller 16 may be located in an operator-accessible housing (not depicted) proximate to the detector stations 30. Accordingly, the controller 16 may comprise a networked host computer, server, or other type of programmable controller. Each of the detector stations 30 may either be in either wired or wireless electronic communication with controller 16. For example, in some embodiments, the detector stations 30 may be connected via Category 5 or 6 cables and use the Ethernet standard for wired communications. In other embodiments, the detector stations 30 may be connected wirelessly, using built-in wireless transceiver, and may use the IEEE 802.11 (WiFi) and/or Bluetooth standards for wireless communications. Other embodiments may include detector stations 30 that use a combination of wired and wireless communication.

Figure 2:
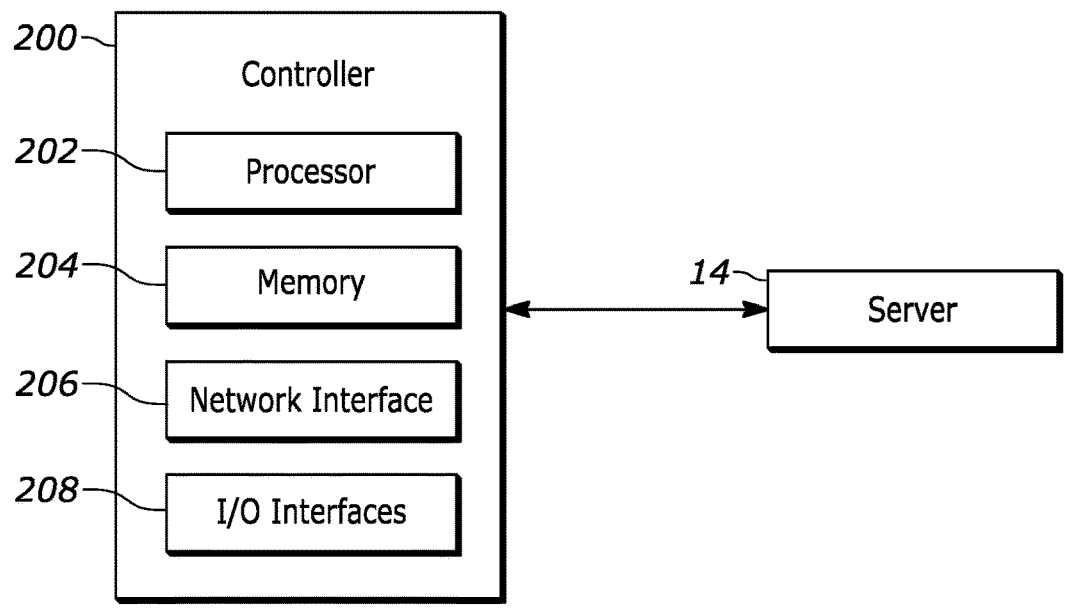
FIG. 2 illustrates an example block diagram of the controller of FIG. 1.

FIG. 2 is a block diagram representative of an example logic circuit capable of implementing, for example, one or more components of the example RFID detection system 112 of FIG. 1 or, more particularly, the example controller 16 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s). For example, the processing platform 200 may use a first communication interface (e.g., Ethernet) to communicate with the detector stations 30 and a second communication interface (e.g., WiFi) to communicate with a central server 14 that amalgamates data from a plurality of RFID detection systems.

The example, processing platform 200 of FIG. 2 also includes input/output (I/O) interfaces 208 to enable receipt of user input and communication of output data to the user.

Figure 3:
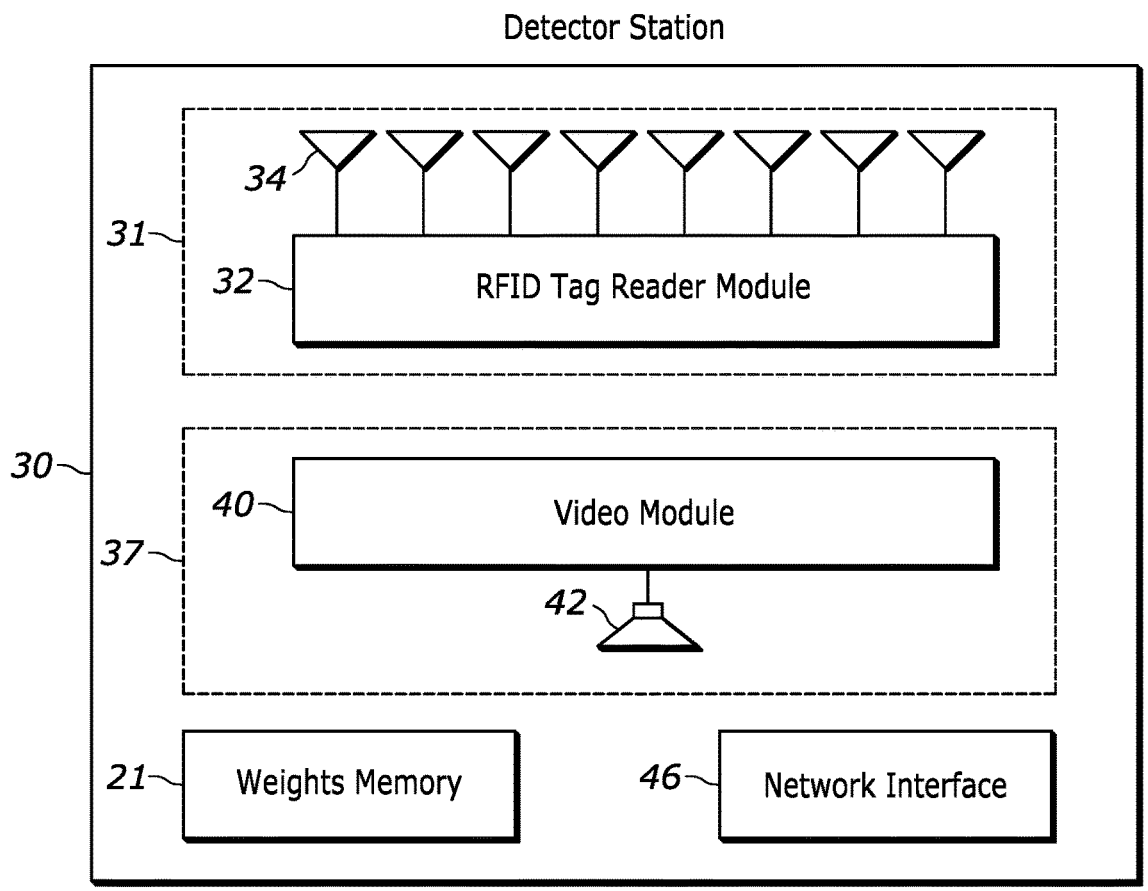
FIG. 3 illustrates an example block diagram of the detector stations of FIG. 1.

FIG. 3 is a block diagram illustrating an example implementation of an embodiment of a detector station 30. In the illustrated example, the detector station 30 includes two example detectors 31 and 37, as further described herein. For example, a detector in the form of an RFID transceiver arrangement 31 is operative for reading the RFID tags 117 affixed to vehicles 115.

More particularly, as shown in FIG. 3, the RFID transceiver arrangement 31 includes an RFID tag reader module 32 that has a controller operatively connected to antenna elements 34, which are energized by the RFID tag reader module 32 to radiate RF energy (also referred to herein as a beam) over an antenna beam pattern. As those of skill will recognize, an antenna and its beam pattern may be characterized by the antenna's beamwidth (i.e., the antenna's half power beamwidth). The RFID transceiver arrangement 31 is operated, under the control of the RFID tag reader module 32, to transmit RF beam or wave energy to the RFID tags 117, and to receive RF response signals (e.g., interrogation response signals) from the RFID tags 117, thereby interrogating and processing the payloads of the RFID tags 117 that are in read range of the RFID transceiver arrangement 31. During operation, the antenna elements 34 may capture RFID tag information (e.g., an identifier of the vehicle, an identifier of an RFID tag, or other unique identifiers) that corresponds to a vehicle 115 traversing the throughway 105.

In some embodiments, the controller 16 of the RFID detection system 112 configures the RFID tag reader module 32 based on instructions received via an I/O interface and/or in response to automatic determinations made thereat. The RFID read range for a detector station 30 may be a 360° zone defined by the RFID antenna elements 34 and their collective beam patterns. In various embodiments, a detector station 30 may include eight RFID antenna elements 34, each maintained in a fixed position and each having a beam pattern extending in a different angle with respect to the detector station 30. In other embodiments, a detector station 30 may include a phased-array antenna that is steerable (electronically and/or mechanically) to produce a beam pattern that extends in a pre-defined angle. In alternate embodiments, the RFID tag reader module 32 may also include fully printed shifters and/or LC circuits (inductor-capacitor resonant circuits) to produce beams at a particular angle relative to the detector station 30. More particularly, the RFID tag reader module 32 may be operatively connected to a weights memory 21 that stores a plurality of weight sets that, when applied to the signals to/from the antenna elements 34, causes the emitted/received signals to constructively interfere in a respective, pre-determined angle with respect to the detector station 30. It should be appreciated that the predetermined angle may include angles in both the azimuthal and elevational axes. For example, in some embodiments, the beams cover a resolution of 10° in elevation and 5° in azimuth.

In the illustrated example of FIG. 3, the detector station 30 may further include a video detector 37 operative for detecting or locating vehicles 115 and/or RFID tags 117 by capturing an image of the lane 107. More particularly, the video detector 37 may be mounted in each detector station 30 and may include a video module 40 having a camera controller that is connected to a camera 42. While FIG. 3 depicts the video detector 37 being mounted in the detector station 30, in some embodiments, the video detector 37 is located in another housing better disposed to capture images of the lane 107. In these embodiments, the video detector 37 is operatively connected to detector station 30. In some embodiments, the camera 42 may be a high-bandwidth, video camera, such as a moving picture expert group (MPEG) compression camera. As referred to herein, the image capture devices or video cameras (also referred to as image sensors herein) are configured to capture image data representative of the respective lanes 107 and any vehicle 115 traversing the lanes 107. Further, the image sensors described herein are example data capture devices, and example methods and apparatuses disclosed herein are applicable to any suitable type of data capture device(s). In various embodiments, the images or data from the images may be time-stamped and synchronized or fused with other data, such as RFID data, and used to further describe, via data, the vehicles 115 and/or the throughway 105. Such synchronized or fused data may be used, for example, by the controller 16 to track vehicle usage of the throughway 105.

The example detector station 30 is configured to cause the RFID tag reader module 31 to execute an interrogation cycle. In some embodiments, the interrogation cycle is defined by a plurality of indications defining, for example, one or more modes of operation for the RFID tag reader module 32, a dwell time the RFID tag reader module 32 spends in each mode of operation, and/or when to broadcast a query and/or a command. To avoid generating cross interference, the interrogation cycles of the detector stations 30 may be synchronized with one another. For example, the interrogation cycle for the detector stations 30a and 30c may be configured to interrogate RFID tags 117 in the lanes 107a 107c, respectively, during a time period when the detector station 30b operates in a standby mode. Similarly, the interrogation cycle for the detector station 30b may be configured to interrogate RFID tags 117 in the lane 107b during a time period when the detector stations 30a and 30c operate in a standby mode. The RFID tag reader module 32 may include local storage that stores the indications that define the read cycle.

Figure 4:
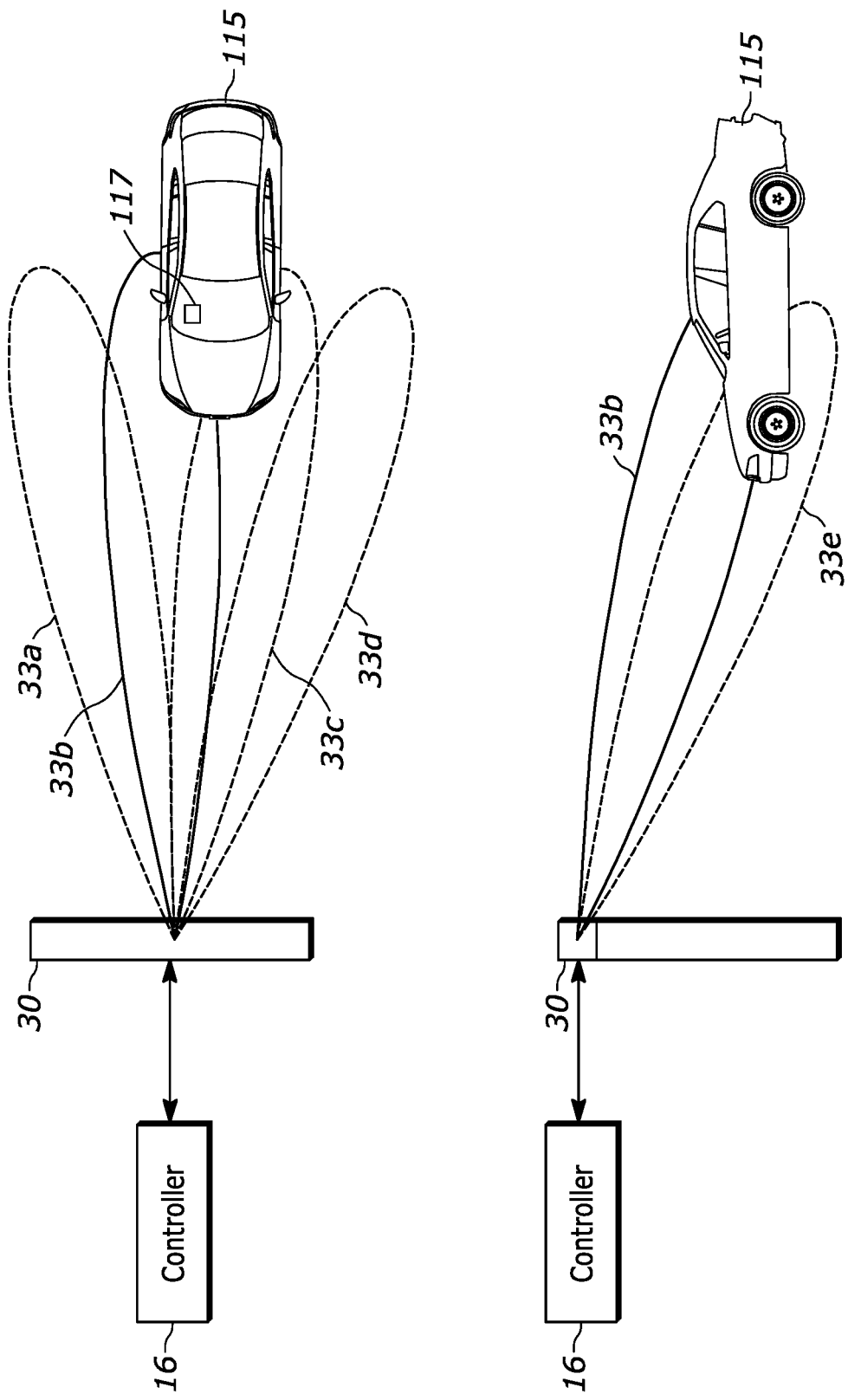
FIG. 4 illustrates the RFID detection system selecting a beam directed at a vehicle of FIG. 1.

As described above, improving the directionality of the beams generated by the RFID tag reader module 32 during the interrogation cycle improves the ability of the detector station 30 to interrogate the RFID tags 117 while reducing the interference with adjacent detector stations 30. Turning to FIG. 4, illustrated from both a top view and a side view is an example scenario where the RFID detection system 112 selects a particular beam 33 directed at a vehicle 115. As illustrated, a weights database 21 of the detector station 30 may be configured to store weight sets that corresponds to the beams 33a-e, wherein each of beams 33a-e are oriented at a different predetermined angle, in azimuth and/or elevation, with respect to the detector station 30.

As described above, the controller 16 may be configured to receive a frame of image data from the video detector 37 of the detector station 30. The controller 16 then analyzes the received frames of image data to detect the presence of the vehicle 115 in the image data. For example, the controller may execute a machine learning algorithm and/or a rules-based algorithm to detect a presence of the vehicle 115 in the frame of image data. For example, the machine-learning algorithm may be trained to detect portions of a frame that correspond to vehicles. Because the location of the detector station 30 and/or the video detector 37 are generally fixed, the controller 16 is able to determine a relative position of the vehicle 117 to the detector station 30 based upon the location of the vehicle 115 in the image data. Using the relative position, the controller 16 is able to identify a particular beam 33 directed towards the relative position.

It should be appreciated that given the relative size of vehicles to a typical beam width, multiple beams of the controller 30 may be directed towards the relative position of the vehicle. For instance, in the illustrated example of FIG. 4, the controller 16 may determine that beams 33b, 33c, and 33e are directed toward relative position of the vehicle. Accordingly, to select the most appropriate beam 33 from the multiple beams directed at the relative position of the vehicle, the controller 16 may execute additional analyses of the frame of image data to identify a particular feature of the vehicle 115 at which the RFID tag 117 is likely to be disposed. For example, as is the case in the illustrated example of FIG. 4, when the RFID tag 117 is affixed to a windshield of the vehicle 115, the RFID tag 117 may be present in the frame of image data. Accordingly, the controller 16 may execute an algorithm configured to detect the presence of the RFID tag 117 within the portion of the frame of image data corresponding to the vehicle 115. In the illustrated example of FIG. 4, this analysis results in the controller 16 selecting the beam 33b as opposed to the beams 33c and 33e. Upon determining that the beam 33b is directed towards the RFID tag 117, the controller 16 may cause the detector station 30 to execute an interrogation cycle using the weight set that corresponds to the beam 33b. More particularly, the controller 16 may configure the RFID tag reader module 32 of the detector station 30 to begin executing interrogation cycles using the weight set that corresponds to the beam 33b.

In some embodiments, after selecting a particular beam 33, the controller 16 may control the RFID transceiver arrangement 31 to make other adjustments to the beam pattern to improve the likelihood that the RFID tag 117 is read during an interrogation cycle. For example, the controller 16 may analyze the frame of image data from the video detector 37 to determine a vehicle type (e.g., sedan, SUV, or semi-truck, speed boat, yacht, or cruise ship, etc.). Depending on the vehicle type, the controller 16 may adjust a beam height and/or beam width. To this end, the controller 16 may increase the beam height when attempting to direct a beam 33 at a windshield of a semi-truck. Similarly, the controller 16 may adjust the beam width to be wider when attempting to direct a beam 33 at a windshield, as opposed to a license plate assembly. As yet another example, if the controller 16 is able to detect the presence of the RFID tag 117 in the frame of image data, the controller 16 may adjust the beam height and/or width of the selected beam 33 to direct additional beam power towards the location of the RFID tag 117. To effect the change in beam height and/or width, the controller 16 may send a signal to the RFID transceiver arrangement 31 indicative of an adjustment factor (e.g., 0.75, 0.9, 1.1, 1.25, etc.), and the RFID transceiver arrangement 31 determines the appropriate adjustment to the set of weights in the memory 21 to achieve the indicated change in beam height and/or beam width.

In other scenarios, the additional analysis may not be able to detect the presence of the RFID tag 117 within the frame of image data. Accordingly, the controller 16 may execute additional analyses to detect features of the vehicle at which the RFID tag 117 is likely to be disposed. For example, the features may be a windshield of the vehicle 115 and/or a particular portion thereof (e.g., left side, center, right side), a license plate assembly of the vehicle 115, a roof of the vehicle 115 and/or an assembly thereon, a roof of a trailer towed by the vehicle 115 and/or an assembly thereon, and/or other locations known in the art. The controller 16 may then associate one or more of the features of the vehicle 115 with a corresponding beam 33 directed at that feature. Accordingly, the controller 16 may cause the controller 30 to execute a series of interrogation cycles that rotate between the weight sets that corresponds to the different features of the vehicle 115. That is, if after a predetermined number of interrogation cycles occur (e.g., one, two, three, etc.) without detecting a read event associated with the vehicle 115, the controller 16 may adjust the RFID transceiver arrangement 31 to generate a beam 33 directed at a different feature of the vehicle 115.

In some embodiments, the particular features of the vehicle 115 may be ranked generally in terms of likelihood the RFID tag 117 is located thereat. Adjustments to the rankings may account for the proximity of features to higher ranking features (i.e., based upon a likelihood the RFID tag 117 located at the feature is interrogated by a beam 33 directed at a higher ranking feature) and/or a type of vehicle 115. For example, cars may be more likely to have RFID tags 117 disposed on windshields, whereas semi-trucks are more likely to have RFID tags 117 disposed on a roof of the cabin. As another example ranking factor, the controller 16 may determine a jurisdiction of origin for the vehicle (e.g., by analyzing the image data of the vehicle license plate) to identify any jurisdictional rules associated with RFID tag location. Accordingly, when the controller 16 controls the RFID transceiver arrangement 31 to generate a beam directed at a different feature of the vehicle 115, the controller 16 may select the feature based upon the determined feature rankings. Given the limited time the vehicle 115 passes through a portion of the lane 107 within a read range of the RFID transceiver arrangement 31, this ranking process improves the likelihood that the RFID tag 117 is read while the vehicle 115 passes through the read range of the detector station 30.

After identifying the vehicle 115 (and/or features thereof), the controller 16 may continue to track the vehicle 115 through successive frames of image data received from the video detector 37 of the detector station 30. Based on the location of the vehicle 115 in the successive frames of image data, the controller 16 is able to estimate a speed of the vehicle. Accordingly, rather than controlling the detector station 30 to use the beam 33 currently directed at the RFID tag 117 and/or feature of the vehicle 115, the controller 16 may utilize the estimated speed of the vehicle 115 to determine an expected relative position of the vehicle 115 during a future interrogation cycle and select the beam 33 based upon the expected relative position. In some embodiments, the expected position determination also factors in processing delay due to the image analysis techniques performed by the controller 16. Accordingly, any reference to selecting a beam directed at a relative position of the vehicle 115 also envisions selecting a beam directed at an expected relative position of the vehicle 115. It should be appreciated that the controller 16 may update the expected position of tracked vehicles as additional frames of image data are received from the video detector 37. As such, the detector station 30 is able to generate beams 33 directed at the expected relative position of the vehicle 115 even as the vehicle 115 passes through the read area of the detector station 30.

In some scenarios, the controller 16 may determine that multiple vehicles 115 are located in the same lane 107 (e.g., the vehicles 115*c* and 115*d* of FIG. 1). In some embodiments, the controller 16 may cause the detector station 30 to execute an interrogation cycle that superimposes the beams 33 directed at the relative positions both vehicles. That said, to comply with maximum power regulations, the transmit power assigned to each of the beams may be scaled. For example, the detector station 30 may assign more transmit power to the beam directed at the relative position of the closer vehicle to prioritize the vehicle 117 that will be outside of the read area of the detector station 30 the soonest. As another example, the detector station 30 may assign more transmit power to the beam directed at the relative position of the further vehicle to account for the increased distance from the detector station 30. In other embodiments, to avoid power scaling, the controller 16 may cause the detector station 30 to alternate between interrogation cycles that direct beams 33 at the relative position of the first vehicle and interrogation cycles that direct beams 33 at the relative position of the second vehicle.

After the controller 16 detects a read event associated with a vehicle 115 (or, more particularly, the RFID tag 117 associated therewith), the controller 16 may update a record to track the usage of the throughway 105 by the vehicle 115. For example, if the RFID detection system 112 is associated with a tolling system, the controller 16 notify the server 14 such that an account associated with the vehicle 115 is assessed the appropriate toll. As another example, if the RFID detection system 112 is associated with a warehouse or other industrial environment, the controller 16 may notify the server 14 to ensure vehicle compliance with an assigned task.

As part of updating the record, the controller 16 may extract data included in the response from the RFID tag 117 for inclusion in the record. For example, in response to an interrogation signal transmitted by the RFID transceiver arrangement 31, the RFID tag 117 may respond with an identifier that uniquely identifies the vehicle 115 or the RFID tag 117. Accordingly, the controller 16 may transmit a notification to the server 14 that indicates that the unique identifier was associated by a read event detected by the RFID detection system 112. The server 14 may then identify an account associated with the unique identifier to update the corresponding record. In some embodiments, the controller 16 may also include image data captured by the video detector 37 in the notification sent to the server 14 to ensure the accuracy of the read event. For example, the controller 16 may extract image data representative of the license plate of the vehicle 115 such that optical character recognition (OCR) techniques can be applied by either the controller 16 or the server 14 to ensure the unique identifier obtained from the RFID tag 117 matches an indication of the license plate in the record maintained at the server 14.

After the controller 16 detects a read event associated with the vehicle 115, the controller 16 may stop tracking the vehicle 115 via the video detector 37. Additionally, if the vehicle 115 is so close to the edge of the frame of image data that the RFID transceiver arrangement 31 will be unable to interrogate the RFID tag 117 in a subsequent interrogation cycle, the controller 16 may also stop tracking the vehicle 115 via the video detector 37. If the controller 16 detects that that there are no vehicles being tracked by the controller 16 within the lane 107 corresponding to the detector station 30, the controller 16 may cause the RFID transceiver arrangement 31 of the detector station 30 to operate in a standby mode until the controller 16 detects a vehicle 115 in a frame of image data received from the video detector 37 of the detector station 30. By operating RFID transceiver arrangements 31 in a standby mode when no vehicles 115 are present, the interference sensed by detector stations 30 that monitor adjacent lanes 107 is reduced.

Figure 5:
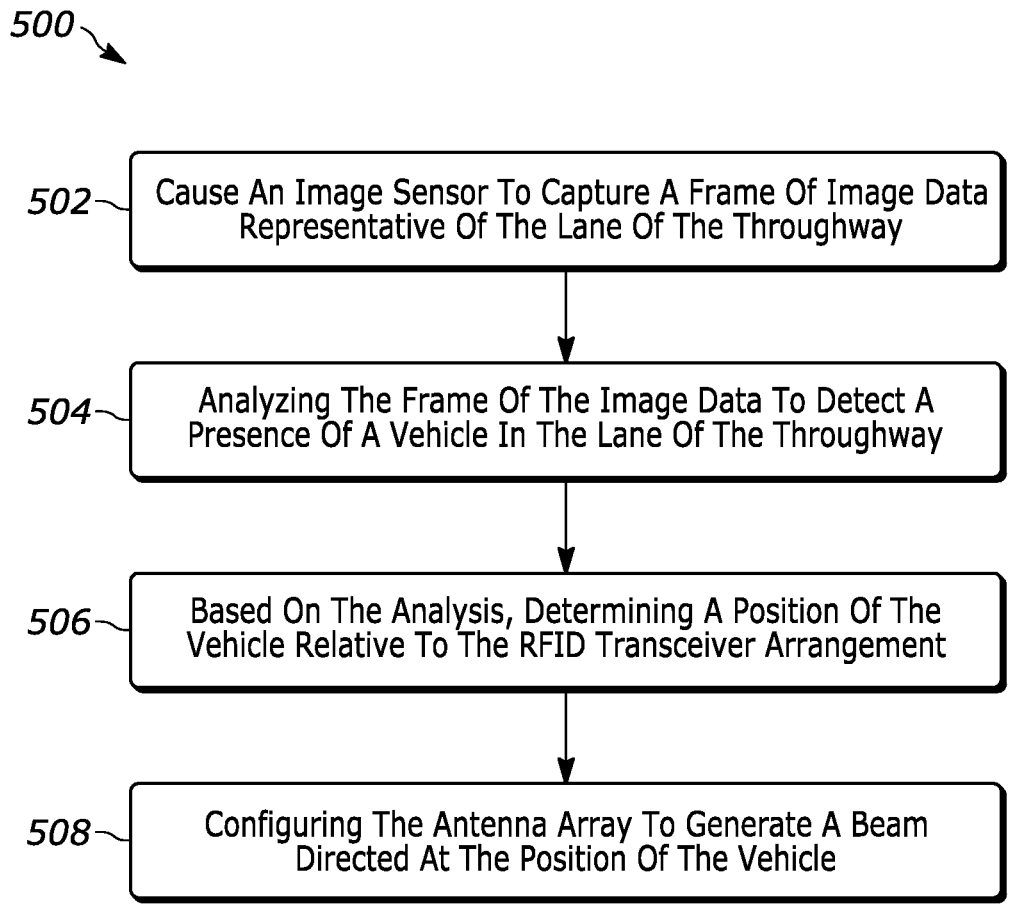
FIG. 5 is a flow diagram of an example method for monitoring a throughway using the RFID detection system of FIG. 1.

Turning now to FIG. 5, illustrated is a flow diagram of an example method 500 for monitoring a throughway (such as the throughway 105) using an RFID detection system (such as the RFID detection system 112). The RFID detection system may include an image sensor (such as a camera 42 of the video detector 37) configured to have a field of view directed towards a lane (such as the lane 107) of the throughway. The RFID detection system may also include an RFID transceiver arrangement (such as the RFID transceiver arrangement 31) configured to interrogate RFID tags (such as the RFID tags 117) disposed on vehicles (such as the vehicles 115) within the lane of the throughway. In some embodiments, the TFID transceiver arrangement includes an antenna array. In some embodiments, the image sensor and the RFID transceiver arrangement are included in a detector station (such as the detector station 30). The RFID detection system may also include a controller (such as the controller 16) operatively connected to the image sensor and the RFID transceiver arrangement and configured to execute the steps of the example method 500.

The method 500 begins at block 502 when the controller causes the image sensor to capture a frame of image data representative of the lane of the throughway. For example, the controller may signal the video detector and/or a video module (such as the video module 40) to begin capturing frames of image data via the image sensors. In this example, the video detector sends the captured frames image data to the controller.

At block 504, the controller analyzes, the frame of image data to detect a presence of a vehicle in the lane of the throughway. For example, the controller may execute an algorithm (such as a rules-based algorithm or a trained machine learning algorithm) to identify a presence of the vehicle in the frame of image data. In some embodiments, upon detecting the presence of the vehicle, the controller begins tracking the vehicle across multiple frames of image data received from image sensor.

At block 506, based on the analysis, the controller determines a position of the vehicle relative to the RFID transceiver arrangement (and/or the detector station that includes the RFID transceiver arrangement). In embodiments that track the vehicle across multiple frames of image data, the controller may compare the position of the vehicle across multiple frames of image data to estimate a speed of the vehicle. Based on the estimated speed of the vehicle, the controller then predicts a position of the vehicle relative to the RFID transceiver arrangement for a subsequent interrogation cycle of the RFID transceiver arrangement. Said another way, the controller may determine a predicted or expected relative of the position of the vehicle.

At block 508, the controller configures the antenna array to generate a beam directed at the position of the vehicle. In embodiments that track the vehicle across multiple frames of image data, the position of the vehicle is the predicted or expected position of the vehicle. In some embodiments, the RFID transceiver arrangement includes a plurality of predetermined gain profiles (e.g., sets of weights stored in a memory such as the weights memory 21) respectively configured to generate a beam directed at a predetermined angle from the antenna array. Accordingly, based on the position of the vehicle, the controller may determine an angle at which the vehicle is positioned relative to the RFID transceiver arrangement and select a gain profile from the plurality of gain profiles corresponding to the determined angle. Regardless, to configure the antenna array, the controller may instruct the RFID transceiver arrangement to use the selected gain profile when executing an interrogation cycle.

In some embodiments, the controller may configure the antenna array to steer the beam more particularly at the RFID tag on the vehicle. Accordingly, the controller may identify a predetermined location of the vehicle at which an RFID tag may be located and configure the antenna array to generate the beam such that the beam is directed towards the predetermined location of the vehicle. In this embodiment, the controller may determine that a read event corresponding to an RFID tag affixed to the vehicle has not occurred for a threshold number of interrogation cycles and configure the antenna array to generate a beam directed at a second predetermined location of the vehicle. Alternatively, the controller may analyze the frame of image data to identify an RFID tag affixed to the vehicle, wherein the RFID tag includes an RFID tag and configure the antenna array to generate the beam such that the beam is directed towards the RFID tag. In either case, the controller may adjust a height or width of the beam to ensure the RFID tag and/or vehicle feature is better located within the beamform. In some embodiments, the adjustment to the height or width of the beam is based upon a vehicle type of the vehicle.

In some scenarios, the controller detects the presence of two or more vehicles located within the lane of the throughway based on the analysis of the frame of image data. In some embodiments, the controller configures the gain profile of antenna array to include a peak directed at each of the two or more vehicles. In other embodiments, the controller configures the antenna array to generate a beam directed at the position of a first vehicle of the two or more vehicles during for a first interrogation cycle of the RFID transceiver arrangement; and a beam directed at the position of a second vehicle of the two or more vehicles during for a second interrogation cycle of the RFID transceiver arrangement.

In some embodiment, the controller detects a response to an interrogation signal included in the generated beam. For example, the response may include an identifier associated with at least one of the vehicle and an RFID tag of the vehicle. In response, the controller may analyze the frame of image data to identify a license plate of the vehicle and transmit, to a server communicatively coupled to the RFID detection system, a notification that includes an indication of the identifier and an indication of the license plate. In some embodiments, the indication of the license plate is a portion of the frame of image data corresponding to the license plate.

To reduce interference in embodiments that include multiple detector stations that include respective RFID transceiver arrangements configured to interrogate RFID tags disposed on vehicles in respective lanes of the throughway, the controller may be configured to synchronize a first interrogation cycle performed by the first RFID transceiver arrangement and a second interrogation cycle performed by the second RFID transceiver arrangement (e.g., an adjacent detector station) such that during the first interrogation cycle, the RFID transceiver arrangement of the first detector station is configured to interrogate RFID tags within the first lane of the throughway and the second RFID transceiver arrangement of the second detector station operates in a standby mode. Similarly, during the second interrogation cycle, the controller configures the first RFID transceiver arrangement to operate in a standby mode and the second RFID transceiver arrangement to interrogate RFID tags within the second lane of the throughway. If the RFID detection includes a third detector station disposed on the opposite side of the second detector station, the controller may configure the RFID transceiver arrangement of the third detector station to interrogate RFID tags within the third lane of the throughway during the first interrogation cycle and operate in a standby mode during the second interrogation cycle.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A radio frequency identification (RFID) detection system for monitoring a throughway, the RFID detection system comprising:
   an image sensor configured to have a field of view directed towards a lane of the throughway;
   an RFID transceiver arrangement configured to interrogate RFID tags disposed on vehicles within the lane of the throughway, wherein the RFID transceiver arrangement includes an antenna array; and
   a controller operatively connected to the image sensor and the RFID transceiver arrangement, wherein the controller is configured to:
   cause the image sensor to capture a frame of image data representative of the lane of the throughway;
   analyze the frame of image data to detect a presence of a vehicle in the lane of the throughway;
   based on the analysis, determine a position of the vehicle relative to the RFID transceiver arrangement; and
   configure the antenna array to generate a beam directed at the determined position of the vehicle by identifying a predetermined location of the vehicle at which an RFID tag is located, and configuring the antenna array to generate the beam such that the beam is directed towards the predetermined location of the vehicle,
   wherein to configure the antenna array to generate the beam directed at the predetermined location of the vehicle, the controller is configured to:
   determine a position of the predetermined location of the vehicle based upon a vehicle type of the vehicle; and
   based upon the determined position, adjust a height or width of the beam.

2. The RFID detection system of claim 1, wherein:
   the RFID transceiver arrangement includes a plurality of predetermined gain profiles respectively configured to generate a beam directed at a predetermined angle from the antenna array; and
   to configure the antenna array to generate the beam directed at the position of the vehicle, the controller is configured to:
   based on the position of the vehicle, determine an angle at which the vehicle is positioned relative to the RFID transceiver arrangement, and
   select a gain profile from the plurality of gain profiles corresponding to the determined angle.

3. The RFID detection system of claim 1, wherein the controller is configured to detect the presence of the vehicle using a machine learning algorithm.

4. The RFID detection system of claim 1, wherein the predetermined location of the vehicle is one of a windshield, a license plate assembly, and a roof.

5. The RFID detection system of claim 1, wherein to configure the antenna array to generate the beam directed at the position of the vehicle, the controller is configured to:
   analyze the frame of image data to identify an RFID tag affixed to the vehicle; and
   configure the antenna array to generate the beam such that the beam is directed towards the RFID tag.

6. The RFID detection system of claim 5, wherein to configure the antenna array to generate the beam directed at the RFID tag, the controller is configured to:
   determine a position of the RFID tag relative to the vehicle; and
   based upon the relative position, adjust a height or width the beam.

7. The RFID detection system of claim 1, wherein to analyze the set of image data to detect the presence of a vehicle, the controller is configured to:
   detect the presence of two or more vehicles located within the lane of the throughway.

8. The RFID detection system of claim 7, wherein to configure the antenna array to generate the beam directed at the position of the vehicle, the controller is configured to:
   configure the gain profile of antenna array to include a peak directed at each of the two or more vehicles.

9. The RFID detection system of claim 7, wherein to configure the antenna array to generate the beam directed at the position of the vehicle, the controller is configured to:
   configure the antenna array to generate a beam directed at the position of a first vehicle of the two or more vehicles during for a first interrogation cycle of the RFID transceiver arrangement; and configure the antenna array to generate a beam directed at the position of a second vehicle of the two or more vehicles during for a second interrogation cycle of the RFID transceiver arrangement.

10. The RFID detection system of claim 1, wherein:
the controller is configured to select a predetermined location of the vehicle from two or more predetermined locations of the vehicle; and
to configure the antenna array to generate the beam directed at the position of the vehicle, the controller is configured to:
configure the antenna array to generate a beam directed at the position of the vehicle based upon a first predetermined location of the two or more predetermined locations;
determine that a read event corresponding to an RFID tag affixed to the vehicle has not occurred for a threshold number of interrogation cycles; and
responsive to the determination, configure the antenna array to generate a beam directed at the position of the vehicle based upon a second predetermined location of the two or more predetermined locations.

11. The RFID detection system of claim 1, wherein to configure the antenna array to generate the beam directed at the position of the vehicle, the controller is configured to:
track the vehicle across multiple frames of image data; and
compare the position of the vehicle across multiple frames of image data to estimate a speed of the vehicle;
predict the position of the vehicle relative to the RFID transceiver arrangement for a subsequent interrogation cycle of the RFID transceiver arrangement; and
generate the beam such that the beam is directed towards the predicted position of the vehicle during the subsequent interrogation cycle.

12. The RFID detection system of claim 1, wherein:
the lane of the throughway is a first lane of the throughway,
the RFID transceiver arrangement is a first transceiver arrangement; and
the RFID detection system further comprises:
a second RFID transceiver arrangement configured to interrogate RFID tags disposed on vehicles within a second lane of the throughway, wherein the second RFID transceiver arrangement includes a second antenna array.

13. The RFID detection system of claim 12, wherein the controller is configured to:
synchronize a first interrogation cycle performed by the first RFID transceiver arrangement and a second interrogation cycle performed by the second RFID transceiver arrangement such that:
during the first interrogation cycle, the first RFID transceiver arrangement is configured to interrogate RFID tags within the first lane of the throughway and the second RFID transceiver arrangement operates in a standby mode; and
during the second interrogation cycle, the first RFID transceiver arrangement operates in a standby mode and the second RFID transceiver arrangement is configured interrogate RFID tags within the second lane of the throughway.

14. The RFID detection system of claim 13, further comprising:
a third RFID transceiver arrangement configured to interrogate RFID tags disposed on vehicles within a third lane of the throughway, wherein (i) the third RFID transceiver arrangement includes a third antenna array, and (ii) the second RFID transceiver arrangement is disposed between the first transceiver arrangement and the third transceiver arrangement;
wherein to synchronize the first interrogation cycle and the second interrogation cycle, the controller is configured to:
control the third RFID transceiver arrangement to interrogate RFID tags within the third lane of the throughway during the first interrogation cycle; and
control the third RFID transceiver arrangement to operate in a standby mode during the second interrogation cycle.

15. The RFID detection system of claim 1, wherein the controller is configured to:
detect a response to an interrogation signal included in the generated beam, the response including an identifier associated with at least one of the vehicle and an RFID tag of the vehicle;
analyze the frame of image data to identify a license plate of the vehicle;
transmit, to a server communicatively coupled to the RFID detection system, a notification that includes an indication of the identifier and an indication of the license plate.

16. The RFID detection system of claim 15, wherein the indication of the license plate is a portion of the frame of image data that is representative of the vehicle.

17. A method for monitoring a throughway using a radio frequency identification (RFID) detection system, the RFID detection system comprising (i) an image sensor configured to have a field of view directed towards a lane of the throughway; (ii) an RFID transceiver arrangement configured to interrogate RFID tags disposed on vehicles within the lane of the throughway, wherein the RFID transceiver arrangement includes an antenna array; and (iii) a controller operatively connected to the image sensor and the RFID transceiver arrangement, the method comprising:
causing, by the controller, the image sensor to capture a frame of image data representative of the lane of the throughway;
analyzing, by the controller, the frame of image data to detect a presence of a vehicle in the lane of the throughway;
based on the analysis, determining, by the controller, a position of the vehicle relative to the RFID transceiver arrangement; and
configuring, by the controller, the antenna array to generate a beam directed at the determined position of the vehicle by identifying a predetermined location of the vehicle at which an RFID tag is located, and configuring the antenna array to generate the beam such that the beam is directed towards the predetermined location of the vehicle, wherein
configuring the antenna array to generate the beam directed at the predetermined location of the vehicle comprises:
determining, by the controller, a position of the predetermined location of the vehicle based upon a vehicle type of the vehicle; and
based upon the determined position, adjusting, by the controller, a height or width of the beam.

18. The method of claim 17, wherein:
the RFID transceiver arrangement includes a plurality of predetermined gain profiles respectively configured to generate a beam directed at a predetermined angle from the antenna array; and configuring the antenna array to generate the beam directed at the position of the vehicle comprises:
based on the position of the vehicle, determining, by the controller, an angle at which the vehicle is positioned relative to the RFID transceiver arrangement, and
selecting, by the controller, a gain profile from the plurality of gain profiles corresponding to the determined angle.

19. The method of claim 17, wherein configuring the antenna array to generate the beam directed at the position of the vehicle comprises:
analyzing, by the controller, the frame of image data to identify an RFID tag affixed to the vehicle; and
configuring, by the controller, the antenna array to generate the beam such that the beam is directed towards the RFID tag.

20. The method of claim 17, wherein configuring the antenna array to generate the beam directed at the position of the vehicle comprises:
detecting, by the controller, the presence of two or more vehicles located within the lane of the throughway;
configuring, by the controller, the gain profile of the antenna array to include a peak directed at each of the two or more vehicles.

21. The method of claim 17, wherein configuring the antenna array to generate the beam directed at the position of the vehicle comprises:
detecting, by the controller, the presence of two or more vehicles located within the lane of the throughway;
configuring, by the controller, the antenna array to generate a beam directed at the position of a first vehicle of the two or more vehicles during for a first interrogation cycle of the RFID transceiver arrangement; and
configuring, by the controller, the antenna array to generate a beam directed at the position of a second vehicle of the two or more vehicles during for a second interrogation cycle of the RFID transceiver arrangement.

22. The method of claim 17, wherein configuring the antenna array to generate the beam directed at the position of the vehicle, comprises
configuring, by the controller, a antenna array to generate a beam directed at the position of the vehicle based upon a first predetermined location of two or more predetermined locations;
determining, by the controller, that a read event corresponding to an RFID tag affixed to the vehicle has not occurred for a threshold number of interrogation cycles; and
responsive to the determination, configuring, by the controller, the antenna array to generate a beam directed at the position of the vehicle based upon a second predetermined location of the two or more predetermined locations.

23. The method of claim 17, wherein configuring the antenna array to generate the beam directed at the position of the vehicle comprises:
tracking, by the controller, the vehicle across multiple frames of image data; and
comparing, by the controller, the position of the vehicle across multiple frames of image data to estimate a speed of the vehicle;
predicting, by the controller, the position of the vehicle relative to the RFID transceiver arrangement for a subsequent interrogation cycle of the RFID transceiver arrangement; and
generating, by the controller, the beam such that the beam is directed towards the predicted position of the vehicle during the subsequent interrogation cycle.

24. The method of claim 17, wherein:
the lane of the throughway is a first lane of the throughway,
the RFID transceiver arrangement is a first transceiver arrangement; and
the RFID detection system further comprises a second RFID transceiver arrangement configured to interrogate RFID tags disposed on vehicles within a second lane of the throughway, wherein the second RFID transceiver arrangement includes a second antenna array;
wherein the method further comprises:
synchronizing, by the controller, a first interrogation cycle performed by the first RFID transceiver arrangement and a second interrogation cycle performed by the second RFID transceiver arrangement such that:
during the first interrogation cycle, the first RFID transceiver arrangement is configured to interrogate RFID tags within the first lane of the throughway and the second RFID transceiver arrangement operates in a standby mode; and
during the second interrogation cycle, the first RFID transceiver arrangement operates in a standby mode and the second RFID transceiver arrangement is configured interrogate RFID tags within the second lane of the throughway.

25. The method of claim 17, further comprising:
detecting, by the controller, a response to an interrogation signal included in the generated beam, the response including an identifier associated with at least one of the vehicle and an RFID tag of the vehicle;
analyzing, by the controller, the frame of image data to identify a license plate of the vehicle;
transmitting, to a server communicatively coupled to the RFID detection system, a notification that includes an indication of the identifier and an indication of the license plate.

* * * * *